United States Patent [19]

Swenson et al.

[11] Patent Number: 5,544,343
[45] Date of Patent: Aug. 6, 1996

[54] CACHE SYSTEM WITH FILE SURGE PROTECTION AND METHOD FOR MANAGING ALLOCATION OF STORAGE IN THE CACHE

[75] Inventors: Robert E. Swenson, Mendota Heights; Joseph E. Kessler, St. Anthony, both of Minn.

[73] Assignee: Unisys Corporation, Blue Bell, Pa.

[21] Appl. No.: 172,651

[22] Filed: Dec. 23, 1993

[51] Int. Cl.⁶ ........................................ G06F 12/02
[52] U.S. Cl. ........................ 395/460; 395/486; 395/600; 364/DIG. 1; 364/246.1; 364/246.13; 364/246.2
[58] Field of Search ............................ 364/200 MS File, 364/900 MS File; 395/400, 425, 440, 445, 460, 486, 464, 488, 600

[56] References Cited

U.S. PATENT DOCUMENTS

| | | | |
|---|---|---|---|
| 4,394,733 | 7/1983 | Swenson | 395/403 |
| 4,425,615 | 1/1984 | Swenson et al. | 395/441 |
| 4,800,483 | 1/1989 | Yamamota et al. | 395/306 |
| 5,043,885 | 8/1991 | Robison | 395/460 |
| 5,134,563 | 7/1992 | Tayler et al. | 395/250 |
| 5,305,389 | 4/1994 | Palmer | 382/305 |
| 5,309,451 | 5/1994 | Noya et al. | 371/40.4 |

OTHER PUBLICATIONS

E. I. Cohen, et al., *Storage Hierarchies*, IBM Systems Journal, vol. 28, No. 1, 1989, pp. 62–76.

*Primary Examiner*—Glenn Gossage
*Assistant Examiner*—Hiep T. Nguyen
*Attorney, Agent, or Firm*—LeRoy D. Maunu; Charles A. Johnson; Mark T. Starr

[57] ABSTRACT

An outboard file cache system including file surge protection and an improved method for managing allocation of cache storage are disclosed. In an outboard cache, excessive writes to a file are detected by testing whether a segment belonging to a file specified by a nd, which logically precedes one of the segments specified in the command by a predetermined number of segments, is present in the outboard file cache, has been written, and has not been destaged. When a first surge-threshold is reached, a group of segments is selected and destaged. When a second surge-threshold is reached, the outboard cache inhibits allocation of further cache storage for the file for the purpose of writing until a selected group of segments is destaged.

24 Claims, 3 Drawing Sheets

CACHE SYSTEM WITH FILE SURGE PROTECTION AND METHOD FOR MANAGING ALLOCATION OF STORAGE IN THE CACHE

COPENDING PATENT APPLICATIONS

This patent application is related to co-pending patent application Ser. No. 08/174,750, entitled "Outboard File Cache System" to Thomas P. Cooper and Robert E. Swenson, which was filed Dec. 23, 1993, is assigned to the assignee of the present invention, and is herein incorporated by reference.

BACKGROUND OF THE INVENTION

1. Field of the Invention

This invention is generally related to the area of storage hierarchies and more particularly to the management of cache storage in a storage hierarchy.

2. Description of the Prior Art

The performance of data processing systems has improved dramatically through the years. While new technology has brought performance improvements to all functional areas of data processing systems, the advances in some areas have outpaced the advances in other areas. For example, advancements in the rate at which computer instructions can be executed have far exceeded improvements in the rate at which data can be retrieved from storage devices and supplied to the instruction processor. Thus, applications that are input/output intensive, such as transaction processing systems, have been constrained in their performance enhancements by data retrieval and storage performance.

The relationship between the throughput rate of a data processing system, input/output (I/O) intensity, and data storage technology is discussed in "Storage Hierarchies" by E. I. Cohen, et al., IBM Systems Journal, 28 No. 1 (1989)62–76. The concept of the storage hierarchy, as discussed in the article, is used here in the discussion of the prior art. In general terms, the storage hierarchy consists of data storage components within a data processing system, ranging from the cache of the central processing unit at the highest level of the hierarchy, to direct access storage devices at the lowest level of the hierarchy I/O operations are required for access to data stored at the lowest level of the storage hierarchy.

Caching takes place at various levels of the storage hierarchy. An instruction processor cache caches data stored in main memory and main memory essentially caches data stored in secondary storage. A second level cache between an instruction processor cache and the main memory is used in the 2200/900 Series data processing system from Unisys Corporation. Secondary storage devices, such as disk subsystems, are also available with a cache between the electromechanical storage device and the main memory of data processing system.

Present caching techniques are typically implemented according to the physical characteristics of the level of the storage hierarchy being cached and without regard to the logical relationship of the data being cached. As a result, the cache system may be unable to provide the expected performance benefit in certain scenarios.

Present cache systems, such as that described in U.S. Pat. No. 4,394,733 entitled, "Cache/Disk Subsystem", to Robert Swenson, are aware of the physical disk address of the data presently in cache, but are unaware as to which data in cache is logically related. For example, storage may be allocated to a file by the operating system in fixed units of storage called segments. The first segment of the file has a file relative segment offset of 0, the second segment of the file has a file relative segment offset of 1, and so on. Further consider that the physical segments of disk storage allocated to a file are not guaranteed to be contiguous. That is, it cannot be guaranteed that segment 0 of a file resides in the physical disk segment immediately preceding the physical disk segment allocated to segment 1 of the file.

The inability to recognize the logical relationship between physical disk segments in cache storage may adversely impact the performance benefits of the cache system in certain scenarios. For example, some applications cream very large files in the course of their processing. In particular, a merge-sort application combines the contents of two files and outputs a third sorted file. In the context of a cache disk system, the third file does not exist, so every write request results in a write-miss status from the cache disk. Because the sort-merge process is able to very quickly generate write requests, the available cache storage may be monopolized by the sort-merge application. To the extent that the sort-merge application is utilizing cache disk storage, other applications have less cache storage available for their use. For the purposes of this invention disclosure, this file behavior is referred to as "surging". As a result of one file surging, the other applications seeking access to the disk will only have limited cache storage available, thereby causing a substantial decrease in their overall throughput rate.

In the Cache/Disk System of U.S. Pat. No. 4,394,733, a counter is maintained for the number of segments which have been written-to. When this counter reaches a predetermined threshold, further write requests are rejected until the number of written-to segments falls below the selected threshold.

The shortcoming of this is that a single application may effectively monopolize cache storage if it generates write requests too quickly. Other applications must wait for written-to segments from the single application to be destaged before they are allowed to write new segments to cache storage. Thus, all applications are being adversely impacted because of the rate at which a single application is writing dam to a file.

It would be desirable to identify when a file is surging, limit further writing to the single file until segments can be destaged, and eliminate the adverse impact on the performance of other applications when a single file is surging.

SUMMARY OF THE INVENTION

It is an object of the invention to prevent a single file which is undergoing sequential write operations from using excessive cache storage.

Another object is to selectively take preemptive measures for a file undergoing sequential writes, wherein the measures taken vary according to the rate at which sequential write operations are being performed on the file.

A further object of the invention is to destage segments of a file upon detecting a first level of sequential writes to the file.

Still another object of the invention is to destage segments of a file and prevent further allocation of segments in cache storage for the purpose of writing segments to the file until the destage is complete upon detecting a second level of sequential writes to the file, wherein the second level is greater than the first level.

According to the present invention, the foregoing and other objects and advantages are attained by establishing a surge-threshold. If sequential write operations are performed on a file at a rate which exceeds the surge-threshold, the file is surging. Upon receiving a command to process, an outboard file cache searches for the segments of a file identified by the command. If the segments are present in the cache storage, the function specified by the command is performed. Otherwise, if the function is a write and the segments are not present in cache storage, a test is performed to determine whether the file is surging. If the file has exceeded the surge-threshold, then segments in cache storage which belong to the surging file are destaged. Segments are then allocated and the write function is performed.

In accordance with another aspect of the invention, if a file has exceeded the surge-threshold and a write function is requested on segments not present in cache storage, then segments belonging to the surging file are identified for destaging, and allocation of segments in cache storage for the purpose of writing further segments to the file is denied until the identified segments are destaged.

A further object of the invention is to establish first and second surge-thresholds. The first surge-threshold is used to identify a first level of sequential writing to a file and the second surge-threshold is used to identify a second greater level of sequential writing to a file. When sequential writing to a file exceeds the first surge-threshold, segments of the file in cache storage are selected and destaged. Two actions are taken when the second surge-threshold is exceeded. First, segments of the surging file are selected and destaged. Second, the write function is not performed and additional segments in cache storage are not allocated for the purpose of writing until the segments of the surging file are destaged.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE PREFERRED EMBODIMENT

Figure 1:
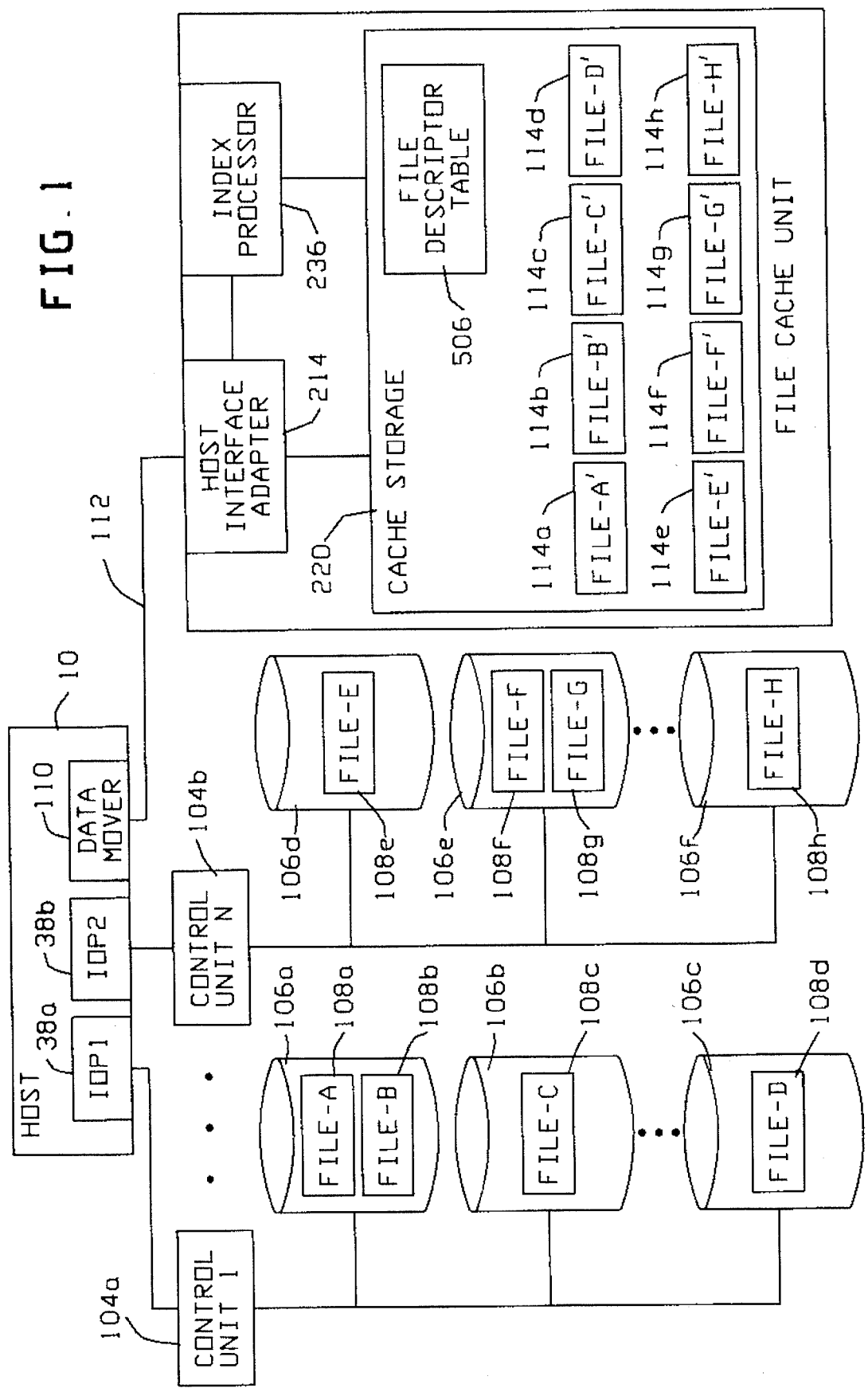
FIG. 1 illustrates the exemplary storage hierarchy in which the present invention is embodied.

FIG. 1 illustrates the exemplary storage hierarchy in which the present invention is embodied. A plurality of Control Units 104*a–b* are coupled to Host 10 via IOPs 38 and 38*b* for providing access to Disks 106*a*, 106*b*, 106*c*, 106*d*, 106*e*, and 106*f*. Application and system software executing on Host 10 reads data from and writes dam to Files 108*a–h*. While Files 108*a–h* are depicted as blocks it should be understood that the data is not necessarily stored contiguously in Disks 106*a–f*.

The exemplary Host 10 is a 2200/900 Series data processing system which is commercially available from the Unisys Corporation. The Host 10 includes Instruction Processors (IPs) which are the basic instruction execution units of the system. Each IP includes a first level cache (not shown) having a section for instructions and a section for operands. The IPs are functional to call instructions from memory, execute the instructions and store the results, and in general, perform data manipulation. The Host further includes Storage Controllers (SCs) directly coupled to the for providing access to Main Storage Units (MSUs).

Each of the SCs also provide interfaces for multiple Input/Output Processors (IOPs) 38*a* and 38*b*. The IOPs read data from the MSUs for writing to perpheral devices 106*a–f*, and read data from peripheral devices for writing to the MSUs. Peripheral devices may include printers, tape drives, disk drives, network communication processors, etc. For the purposes of the present invention, the peripheral devices provide a backing store for long term storage of data and are simply referenced as Disks 106*a–f*.

The IOPs 38*a* and 38*b* are microprocessor controlled units that control the initiation, data transfer, and termination sequences associated with software generated I/O channel programs. Initiation and termination sequences are executed by the microprocessor and data transfer is controlled by hard-wired logic.

Outboard File Cache 102 provides cache storage for Files 108*a–h* with resiliency against data loss which is comparable to Disks 106–*f*. A Data Mover 110 is coupled to the Input/Output Bus 40 in the Host and provides a functionality which is similar to the IOPs 38*a* and 38*b*. The Data Mover provides a Fiber Optic Link 112 to the Outboard File Cache. All or part of Files 108 may be stored in the Outboard File Cache 102 depending upon the storage capacity of the Outboard File Cache 102, and the size and number of Files 108 selected to be cached.

The portion of Files 108*a–h* that are stored in the Outboard File Cache 102 are shown as blocks 114*a*–*h*. The cached portion of Files 108 are labeled File-A', File-B', . . . , File-H' for discussion purposes. File-A' 114*a* is the portion of File-A that is stored in Outboard File Cache 102, File-B' 114*b* is the portion of File-B that is stored in Outboard File Cache 102, etc. The Outboard File Cache at this level of the storage hierarchy allows references to cached files to be immediately directed to the Outboard File Cache 102 for processing, in contrast with a non-cached file where an I/O channel program must be constructed to access the proper disk and the request and data must flow through a possibly lengthy data path.

The Outboard File Cache 102 includes a Host Interface Adapter (HIA) 214, Index Processor (IXP) 236 and Cache Storage 220. The HIA provides the functionality for transferring data between the Cache Storage 220 and the Data Mover 110 on the Host 10. The IXP includes the logic for managing Cache Storage 220, processing commands sent from the Host, and initiating and preparing for data transfer. The File Descriptor Table 506 is stored in Cache Storage and is used and maintained by the IXP in allocating storage for Files 114*a–h*. The copending application which has been incorporated by reference may be consulted for details on the File Descriptor Table 506 and aspects of the overall operation.

Figure 2:
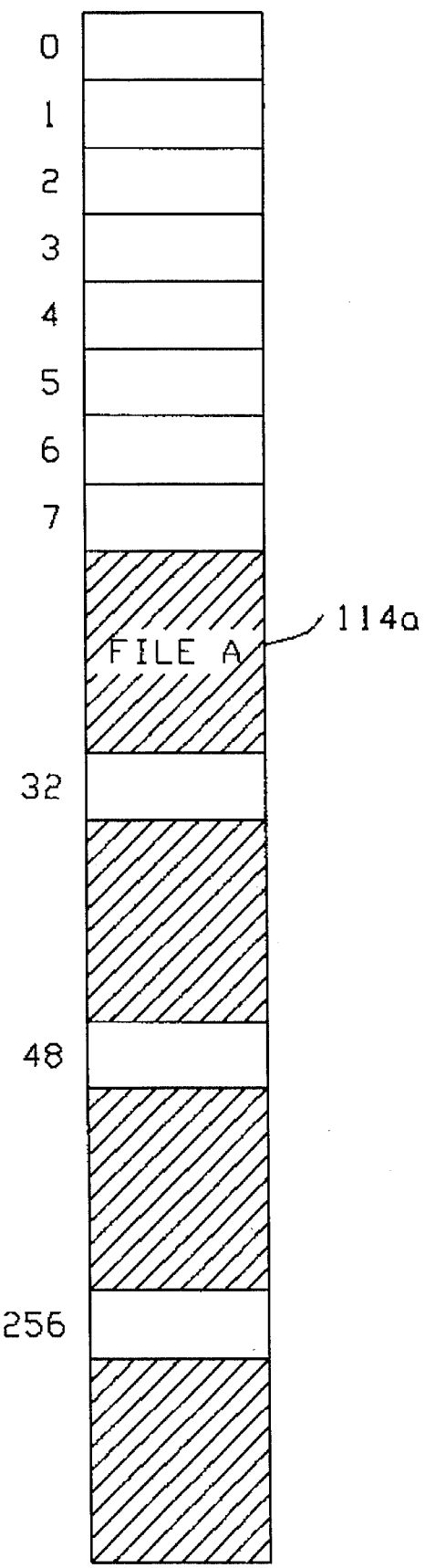
FIG. 2 shows the logical layout of segments in a file.

FIG. 2 shows the logical layout of segments in File A' 114*a*. The invention may be understood with reference to the File A' as it is written to Cache Storage 220. File A' should be viewed as a snapshot of the state of the file at some time after 256 segments have been written to Cache Storage.

The segments of the file are identified by their offset relative to the first segment of the file. Thus, the first segment is numbered segment 0, the second segment is numbered segment 1, and so on. The invention may be understood by tracing the processing steps of FIG. 3 with reference to File A' of FIG. 2 and examining how the creation of File A' in Cache Storage was affected.

Figure 3:
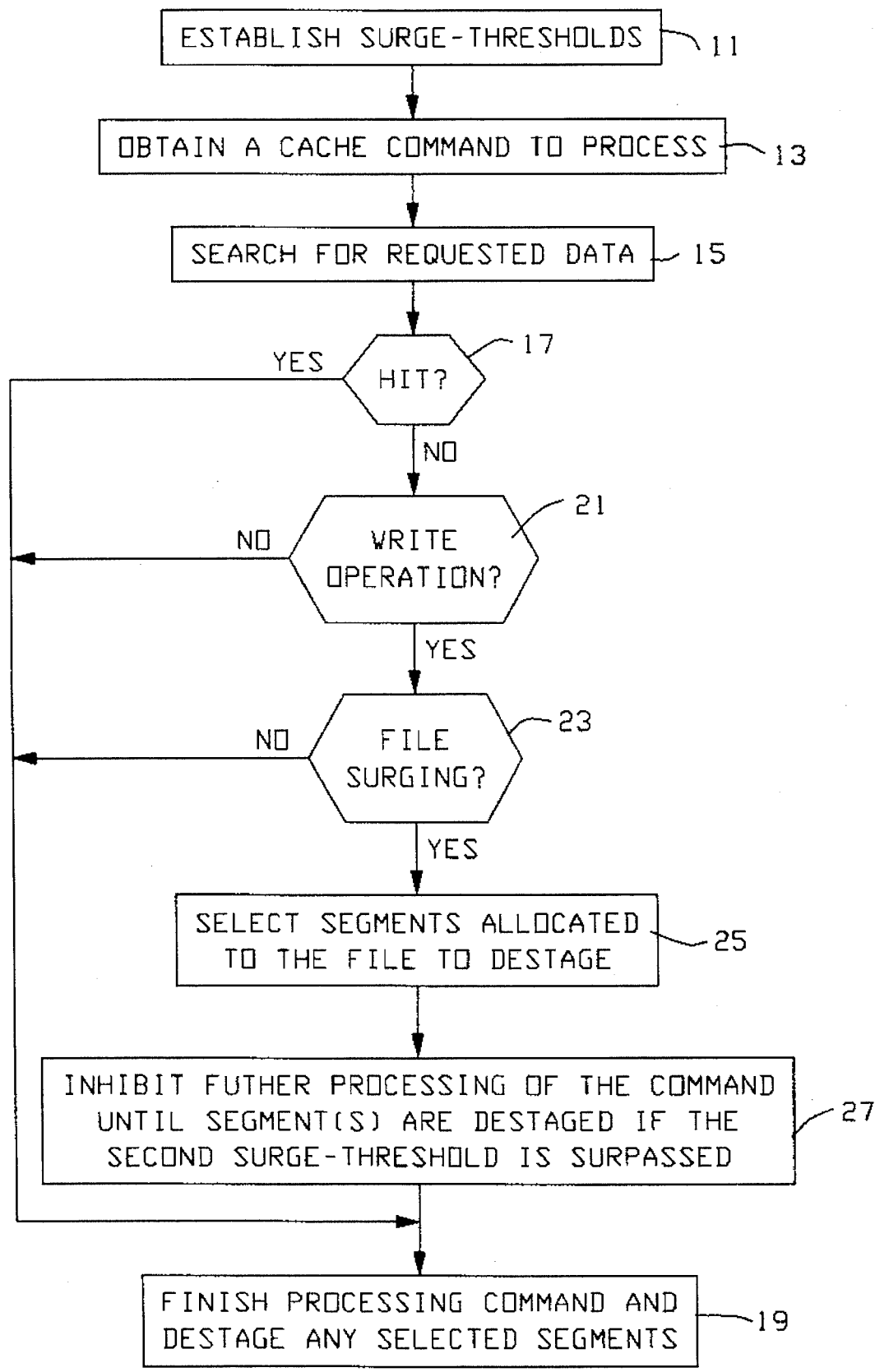
FIG. 3 contains a flowchart of the general processing steps for providing surge protection.

FIG. 3 contains a flowchart of the general processing steps for providing surge protection. Step 11 establishes surge-thresholds. A surge-threshold is used in detecting when a file is surging. In the preferred embodiment two surge-thresholds are implemented. When the number of segments which have been sequentially written in Cache Storage 220 surpasses one of the surge-thresholds, special processing is performed. Those skilled in the art will recognize that one or both surge-thresholds may be used without departing from the spirit of the invention.

The first and second surge-thresholds are used to indicate two levels of surging. The impact on cache storage is more critical when a file exceeds the second surge-threshold than when a file exceeds the first surge-threshold. Therefore, the remedial actions taken vary according to the level of file surging. The nature of the surge-thresholds will become apparent in the processing steps which follow.

Step 13 obtains a command to process. Commands are sent from the Host 10 to the Outboard File Cache 102 for manipulating Files 114a–h. The commands in the exemplary embodiment include a function code, file-identifier, and a file-relative-segment-offset. The function code identifies the operation to be performed on the file (such as read or write), the file-identifier indicates the logical file upon which the operation is to be performed (for example, File A'), and the file-relative-segment-offset specifies the offset from the first segment of the file at which the operation is to be performed. A command may reference one or more segments of a file.

Processing proceeds to Step 15 which searches the File Descriptor Table 506 for the one or more segments specified in the command. Decision Step 17 tests whether Step 15 was successful in locating the desired segments. If the requested segments are present in Cache Storage, control is directed to Step 19 to finish processing the command. Otherwise, control is directed to Step 21.

Step 21 tests whether the function specified in the command is write. The surge condition is not tested when a command other than write (such as read) is issued to the Outboard File Cache 102 because other commands do not result in a segment in Cache Storage 220 which must be destaged. Therefore, for non-write commands control is directed to Step 19 to finish processing the command. Step 19 will proceed to allocate the necessary segments in Cache Storage.

Control is directed to decision Step 23 when a write command is encountered for segments which are not in Cache Storage 220. Decision Step 23 tests whether a file is surging by testing whether either of the surge-thresholds have been exceeded. While not shown in FIG. 3, it should be understood that the write operation is permitted for the first 32 (file-relative-segment-offsets 0–31) segments of a file without testing whether either the first or second surge-thresholds has been exceeded. Thereafter, the test for whether a file has exceeded the first surge-threshold is performed when a write is attempted for a segment whose file-relative-segment-offset is a multiple of 8. Thus, the test for a file exceeding the first surge-threshold will be performed when a write is attempted for segment 32, when a write to segment 40 is attempted, and so on. The test for whether a file has exceeded the second surge-threshold is not performed until a write operations is attempted on the segment whose file-relative-segment-offset is 256. Thereafter, the test for whether a file has exceeded the second surge-threshold is performed when a segment whose file-relative-segment-offset is a multiple of 8 is referenced. Thus, the test for a file exceeding the second surge-threshold will be performed when a write to segment 256 is attempted, when a write to segment 264 is attempted, and so on.

Those skilled in the art will recognize that the particular first and second surge thresholds disclosed in this application may not be suitable for all applications. Optimal values for the surge thresholds could be determined by operational analysis or heuristics.

By way of example, the tests for whether a file has exceeded either the first or second surge-threshold is discussed next. If a command seeks to write to segment 32, and segment 0 (the file-relative-segment-offset of the referenced segment - the first surge-threshold) is in Cache Storage 220, is written, and not destaged (the cache segment has not been saved to one of Disks 106a–h), Test 23 will detect that the first surge-threshold has been exceeded and the file is therefore surging. If segment 0 is not in cache or it has not been written, then decision Step 23 directs control to Step 19 as described above.

If a command seeks to write to segment 256, and segment 0 (the file-relative-segment-offset of the referenced segment —the second surge-threshold) is in Cache Storage 220, is written, and not destaged (the cache segment has not been. saved to one of Disks 106a–f), test 23 will detect that the second surge-threshold has been exceeded and therefore the file is surging beyond that which is desirable. If segment 0 is not in cache or it has not been written, then decision Step 23 directs control to Step 19 as described above.

In the preferred embodiment, the test for a surging file is not performed for each segment accessed. Rather the test is performed upon writing and allocation of segment 32, segment 40, segment 48, segment 56, segment 64, etc. It will be recognized that the test could be performed at different intervals depending upon the particular system in which the invention is implemented.

Step 25 selects segments to destage for the file which is found to be surging. If the first surge-threshold is exceeded upon an attempt to write segment 32, then a group of up to 8 segments between segments 0 and 7 is selected for destaging; if the first surge-threshold is exceeded upon an attempt to write segment 48, then a group of up to 8 segments between segments 8 and 15 is selected for destaging and so on.

If the second-surge threshold is exceeded upon an attempt to write segment 256, then a group of up to 8 segments between segments 0 and 7 are selected for destaging; if the second surge-threshold is exceeded upon an attempt to write segment 264, then a group of up to 8 segments between segments 8 and 14 are selected for destaging, and so on.

Step 27 inhibits further processing of the command until the selected segments are destaged if the second surge-threshold is surpassed. This step is performed when a file exceeds the second surge-threshold but not when the a file exceeds only the first surge-threshold because when the second surge-threshold is surpassed the situation calls for more more serious restrictions on the surging file. In addition to selecting segments to destage (the same as the first surge-threshold), the operation as specified by the function in the command is not performed when the second surge-threshold is surpassed. In contrast, when a file has only exceeded the first surge-threshold, additional segments are identified for destaging and the function specified by the command is performed. Note that the Host 10 may resend the command when a file has exceeded the second surge-threshold and the Outboard File Cache 102 will not fully process the command until the file no longer exceeds the second surge-threshold. Therefore, Step 19 performs the operation specified by the function in the command only if the second surge-threshold is not surpassed, and any segments selected for destaging are destaged.

Having described the preferred embodiment of the invention in the drawings and accompanying description, those skilled in the art will recognize that various modifications to the exemplary embodiment could be made without departing from the scope and spirit of the claims set forth below:

That which is claimed is:

1. A method for managing allocation of storage in an outboard file cache in a data processing system including a host processor coupled to a backing store subsystem and an outboard file cache coupled to the host processor, wherein the backing store subsystem provides long term storage for one or more files of data and each of the files is logically divided into one or more segments, wherein a file has a first segment and the remaining segments of the file are referenced by file-relative-segment-offset which is the logical position relative to the first segment of the file, the outboard file cache capable of caching a plurality of files in cache storage and being responsive to a command that specifies a function and addressing information for one or more specified segments of one of the cached files on which the function is to be performed, the method comprising the steps of:

establishing a predetermined surge-threshold, wherein said surge-threshold is used to identify a file for which destaging of written segments is being performed at a rate which is less than the rate at which segments of that file are being written in the cache storage;

searching the cache storage to determine whether the specified segments are present in the cache storage;

performing the function specified in the command if the specified segments are present in the cache storage;

allocating one or more segments of cache storage for storing one or more of the specified segments if one or more of the specified segments are not present in the cache storage;

detecting when the one of the cached files has exceeded said surge-threshold;

selecting a group of segments in cache storage allocated to the one of the cache files for which said surge-threshold has been exceeded to destage; and destaging said group of segments from said selecting step.

2. The method of claim 1 further including the step of inhibiting said allocating step for the one of the cached files for which said surge-threshold has been exceeded.

3. The method of claim 1 wherein said detecting step includes the step of testing whether a segment belonging to the file specified by the command, which logically precedes one of the one or more segments specified in the command by a first predetermined number of segments, is present in the outboard file cache, has been written, and has been not destaged.

4. The method of claim 3 wherein said testing step is performed only when the file-relative-segment-offset of said one of the one or more segments is a multiple of a second predetermined number of segments.

5. The method of claim 4 wherein said second predetermined number of segments is 8.

6. The method of claim 3 wherein said first predetermined number of segments is 32.

7. A method for managing allocation of storage in an outboard file cache in a data processing system including a host processor coupled to a backing store subsystem and an outboard file cache coupled to the host processor, wherein the backing store subsystem provides long term storage for one or more files of data and each of the files is logically divided into one or more segments, wherein a file has a first segment and the remaining segments of the file are referenced by file-relative-segment-offset which is the logical position relative m the first segment of the file, the outboard file cache capable of caching a plurality of files in cache storage and being responsive to a command that specifies a function and addressing information for one or more specified segments of one of the cached files on which the function is to be performed, the method comprising the steps of:

establishing a predetermined first surge-threshold and a predetermined second surge-threshold, wherein said first surge-threshold and said second surge-threshold are used to identify a file for which destaging of written segments is being performed at a rate which is less than the rate at which segments in the file are being written:

searching the cache storage to determine whether the specified segments are present in the outboard file cache;

performing the function specified in the command if the specified segments are present in the cache storage;

allocating one or more segments of cache storage for storing one or more of the specified segments if one or more of the specified segments are not present in the cache storage;

detecting when the one of the cached files has exceeded said first surge-threshold;

selecting a group of written segments in cache storage allocated to the one of the cached files for which said first surge-threshold has been exceeded to destage;

destaging said group of segments;

detecting when the one of the cached files has exceeded said second surge-threshold; and inhibiting said allocating step for the one of the cached files for which said second surge-threshold has been exceeded.

8. The method of claim 7 wherein said detecting of said first surge-threshold includes the step of testing whether a segment belonging to the file specified by the command, which logically precedes one of the one or more segments specified in the command by a first predetermined number of segments, is present in the outboard file cache, has been written, and has been not destaged; and said detecting of said second surge-threshold includes the step of testing whether a segment belonging to the file specified by the command, which logically precedes one of the one or more segments specified in the command by a second predetermined number of segments, is present in the outboard file cache, has been written, and has been not destaged.

9. The method of claim 8 wherein said first predetermined number of segments is 32.

10. The method of claim 8 wherein said second predetermined number of segments is 256.

11. The method of claim 7 wherein the detecting of said first surge-threshold and the detecting of said second surge-threshold are performed only when the file-relative-segment-offset of said one of the one or more segments is a multiple of a third predetermined number of segments.

12. The method of claim 11 wherein said third predetermined number of segments is 8.

13. In a data processing system having a host processor for issuing file access commands to an outboard file cache for caching a plurality of files, wherein each file is divided into one or more logically contiguous segments and a file access command specifies a function and address information identifying one or more specified segments of one of the cached files on which the function is to be performed, an outboard file cache with surge protection comprising:

cache storage, wherein said cache storage provides random access storage for selectable segments of the cached files, and is allocable by segment:

a file descriptor table, wherein said file descriptor table stores file-identifiers and file-relative-segment-offsets indicative of portions of the files present in said cache storage, and said file descriptor table indicates which ones of said selectable segments have been written and not destaged;

cache detection control means interfaced with said file descriptor table and responsive to one of the file access commands, wherein said cache detection control means detects whether the specified segments are present in said cache storage and activates a miss-signal if the specified segments are not present in said cache storage;

surge detector responsive to said miss-signal and interfaced with said file descriptor table, wherein said surge detector provides a surge-signal when the rate at which segments of a file are being destaged is less than the rate at which segments of the file are being written in the cache storage;

allocation control means interfaced with said file descriptor table and responsive to said miss-signal, wherein said allocation control means selects one or more segments in cache storage to allocate to the one or more of the specified segments when said miss-signal is active;

destage selection means responsive to said surge-signal and interfaced with said file descriptor table for selecting a group of segments in said cache storage belonging to the file specified in said one of said file access commands to destage when said surge-signal is active; and destage means for destaging said group of segments from said destage selection means.

14. The outboard file cache of claim 13 wherein said allocation control means is responsive to said surge-signal and inhibits allocation of segments of a file for which said surge-signal is active until said surge-signal is inactive.

15. The outboard file cache of claim 13 wherein said surge detector includes means for detecting whether a segment belonging to the file specified by a command, which logically precedes one of the one or more segments specified in that command by a predetermined number of segments, is present in the outboard file cache, has been written, and has not been destaged, and for activating said surge-signal.

16. The outboard file cache of claim 15 wherein said predetermined number is 32.

17. The outboard file cache of claim 15 wherein said predetermined number is 256.

18. The outboard file cache of claim 14 wherein said surge detector includes means for detecting whether a segment belonging to the file specified by a command, which logically precedes one of the one or more segments specified in that command by a predetermined number of segments, is present in the outboard file cache, has been written, and has not been destaged, and for activating said surge-signal.

19. In a data processing system having a host processor for issuing file access commands to an outboard file cache for caching a plurality of files, wherein each file is divided into one or more logically contiguous segments and a file access command specifies a function and address information identifying one or more specified segments of one of the cached files on which the function is to be performed, an outboard file cache with surge protection comprising:

cache storage, wherein said cache storage provides random access storage for selectable segments of the cached files, and is allocable by segment:

a file descriptor table, wherein said file descriptor table stores file-identifiers and file-relative-segment-offsets indicative of portions of the files present in said cache storage, and said file descriptor table indicates which ones of said selectable segments have been written and not destaged;

cache detection control interfaced with said file descriptor table and responsive to one of the access commands, wherein said cache detection control detects whether the specified segments are present in said cache storage and activates a miss-signal if said specified segments are not present in said cache storage;

first means interfaced with said file descriptor table for detecting whether a first segment belonging to the file specified by said one of said file access commands, which logically precedes one of said specified segments by a first predetermined number of segments, is present in the cache storage, has been written, and has not been destaged, and for activating a first surge-signal;

second means interfaced with said file descriptor table for detecting whether a second segment belonging to the file specified by said file access commands, which logically precedes one of said specified segments by a second predetermined number of segments, is present in the cache storage, has been written, and has not been destaged, and for activating a second surge-signal;

allocation control interfaced with said file descriptor table and responsive to said miss-signal, wherein said allocation control selects one or more segments in cache storage to allocate to the one or more segments specified in said one of the said file access commands when said miss-signal is active, wherein said allocation control includes control means responsive to said second surge-signal for inhibiting allocation of segments of a file for which said second surge-signal is active until said second surge signal is inactive;

destage selection means responsive to said first surge-signal and said second surge-signal and interfaced with said file descriptor table for selecting a group of segments in said cache storage belonging to the file specified in said file access command to destage when said first surge-signal and said second surge-signal are active; and destage means for destaging said group of segments from said destage selection means.

20. The outboard file cache of claim 19, wherein said first predetermined number is 32 and said second predetermined number is 256.

21. A method for managing allocation of cache storage in a data processing system including a host processor coupled to a backing store subsystem and a cache system coupled to the host processor, wherein the backing store subsystem provides long term storage for one or more files of data and each of the files is logically divided into one or more segments, the cache system capable of caching a plurality of files in cache storage and being responsive to a command that specifies a function and addressing information for one or more specified segments of one of the cached files on which the function is to be performed, the method comprising the steps of:

searching the cache storage to determine whether the specified segments are present in the cache storage;

performing the function specified in the command if the specified segments are present in the cache storage;

allocating one or more segments in the cache storage for storing one or more of the specified segments if one or more of the specified segments are not present in the cache storage;

detecting when destaging of segments of the one of the cached files is being performed at a rate that is less than the rate at which segments of the one of the cached files are being written in the cache storage;

selecting a group of segments in cache storage allocated to the one of the cached files from said detecting step to destage; and destaging said group of segments from said selecting step.

22. The method of claim 21, wherein, said detecting step includes the step of detecting when destaging of segments of the one of the cached files is being performed at a first rate that is less than the rate at which segments of the one of the cached files are being written in the cache storage; and further comprising the steps of:

detecting when destaging of segments of the one of the cached files is being performed at a second rate that is less than the rate at which segments of the one of the cached files are being written in the cache storage, wherein said first rate is less than said second rate; and inhibiting said allocating step for the one of the cached files if said second rate is exceeded for the one of the cached files.

23. An apparatus for managing allocation of cache storage in a data processing system including a host processor coupled to a backing store subsystem and a cache system coupled to the host processor, wherein the backing store subsystem provides long term storage for one or more files of data and each of the files is logically divided into one or more segments, the cache system capable of caching a plurality of files in cache storage and being responsive to a command that specifies a function and addressing information for one or more specified segments of one of the cached files on which the function is to be performed, the cache apparatus comprising:

search means responsive to a command for searching the cache storage to determine whether the specified segments are present in the cache storage;

function processing means responsive to the command for performing the function specified in the command if the specified segments are present in the cache storage;

allocation means coupled to said search means for allocating one or more segments in the cache storage for storing one or more of the specified segments if one or more of the specified segments are not present in the cache storage;

detection means coupled to the cache storage for detecting when destaging of segments of the one of the cached files is being performed at a rate that is less than the rate at which segments of the one of the cached files are being written in the cache storage;

selection means coupled to the cache storage for selecting a group of segments in cache storage allocated to the one of the cached files from said detection means to destage; and destage means coupled to the cache storage for destaging said group of segments from said selection means.

24. The apparatus of claim 23, further comprising limitation means coupled to said detection means and coupled to said allocation means for inhibiting allocation of cache storage for the file from said detecting step.

* * * * *

UNITED STATES PATENT AND TRADEMARK OFFICE
CERTIFICATE OF CORRECTION

PATENT NO. : 5,544,343
DATED : August 06, 1996
INVENTOR(S) : Swenson, et al.

It is certified that error appears in the above-indentified patent and that said Letters Patent is hereby corrected as shown below:

In the Abstract:

Line 5, between "specified by a" and "which" delete "nd," and substitute -- command, --.

In the Claims:

Column 8, Line 15, between "relative" and "the first" delete "m" and substitute -- to --.

Column 10, Line 39, between "by said" and "file" add -- one of said --.

Column 10, Line 49, between "said one of" and " said file" delete -- the --.

Column 10, Line 60, delete "command" and substitute -- commands --.

Column 12, Line 14, between "the" (second occurrence) and "apparatus" delete -- cache --.

Signed and Sealed this

Thirty-first Day of December, 1996

Attest:

BRUCE LEHMAN

*Attesting Officer*　　　*Commissioner of Patents and Trademarks*